(12) United States Patent
Herrera et al.

(10) Patent No.: US 10,664,402 B2
(45) Date of Patent: May 26, 2020

(54) READ OPERATION REDIRECT

(71) Applicant: HEWLETT-PACKARD DEVELOPMENT COMPANY, L.P., Houston, TX (US)

(72) Inventors: Virginia Q. Herrera, Houston, TX (US); Christoph Graham, Houston, TX (US); Thomas Joseph Flynn, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/082,397

(22) PCT Filed: Jan. 27, 2017

(86) PCT No.: PCT/US2017/015383
§ 371 (c)(1),
(2) Date: Sep. 5, 2018

(87) PCT Pub. No.: WO2018/140036
PCT Pub. Date: Aug. 2, 2018

(65) Prior Publication Data
US 2019/0108127 A1 Apr. 11, 2019

(51) Int. Cl.
*G06F 12/08* (2016.01)
*G06F 12/0855* (2016.01)
(Continued)

(52) U.S. Cl.
CPC ...... *G06F 12/0857* (2013.01); *G06F 12/0246* (2013.01); *G06F 12/0638* (2013.01);
(Continued)

(58) Field of Classification Search
CPC ......... G06F 12/0875; G06F 2212/1024; G06F 2212/608
(Continued)

(56) References Cited

U.S. PATENT DOCUMENTS 7,457,880 B1 11/2008 Kim
7,937,521 B2 5/2011 Reid
(Continued)

OTHER PUBLICATIONS

Cai et al., "Read Disturb Errors in MLC NAND Flash Memory: Characterization, Mitigation, and Recovery", Retrieved from Internet—https://users.ece.cmu.edu/~omutlu/pub/flash-read-disturb-errors_dsn15.pdf, 2015, 12 Pages.

*Primary Examiner* — Hua J Song
(74) *Attorney, Agent, or Firm* — HP Inc. Patent Department

(57) ABSTRACT

Example implementations relate to read operation redirect. For example, a system according in the present disclosure may include a data storage device accessible by a host. The system may include an input/output filter of an operating system of the host. The input/output filter may monitor read operations and write operations from the host to the data storage device. The input/output filter may copy a portion of the data storage device to a random-access memory (RAM) buffer within the host responsive to monitored read operations to the portion exceeding a threshold. The input/output filter may redirect a successive read operation, addressed to the portion of the data storage device, to the copy of the portion in the RAM buffer.

15 Claims, 3 Drawing Sheets

(51) Int. Cl.
    *G06F 12/0868*     (2016.01)
    *G06F 12/02*     (2006.01)
    *G06F 12/06*     (2006.01)

(52) U.S. Cl.
    CPC .. *G06F 12/0868* (2013.01); *G06F 2212/1024* (2013.01); *G06F 2212/1036* (2013.01); *G06F 2212/608* (2013.01); *G06F 2212/7203* (2013.01)

(58) Field of Classification Search
    USPC .......................................................... 711/118
    See application file for complete search history.

(56) References Cited

U.S. PATENT DOCUMENTS

| | | |
|---|---|---|
| 8,027,194 B2 | 9/2011 | Lee et al. |
| 8,074,011 B2 | 12/2011 | Flynn et al. |
| 8,281,220 B2 | 10/2012 | Kitahara |
| 8,930,778 B2 | 1/2015 | Cohen |
| 9,229,642 B2 | 1/2016 | Shu et al. |
| 9,250,991 B2 | 2/2016 | Frost et al. |
| 2011/0005545 A1 | 3/2011 | Kuehne |
| 2011/0055458 A1 | 3/2011 | Kuehne |
| 2011/0179219 A1 | 7/2011 | Ma et al. |
| 2012/0059994 A1* | 3/2012 | Montgomery ........ G06F 3/0617 711/119 |
| 2014/0223244 A1 | 8/2014 | Mataya et al. |
| 2016/0026399 A1 | 1/2016 | Purkayastha et al. |

\* cited by examiner

READ OPERATION REDIRECT

BACKGROUND

A data storage device may include a solid-state drive (SSD). An SSD may include a solid-state storage device that utilizes integrated circuitry assemblies as memory to store data persistently. A host device may include a computing device supported by an operating system. Commands to the SSD may be communicated from the host. For example, a command from a host to the SSD may request a read operation and/or a write operation to an address in the SSD. Reading and/or writing to a flash memory cell of an SSD may affect the stored charge on the cell and/or on adjacent cells

DETAILED DESCRIPTION

Figure 1:
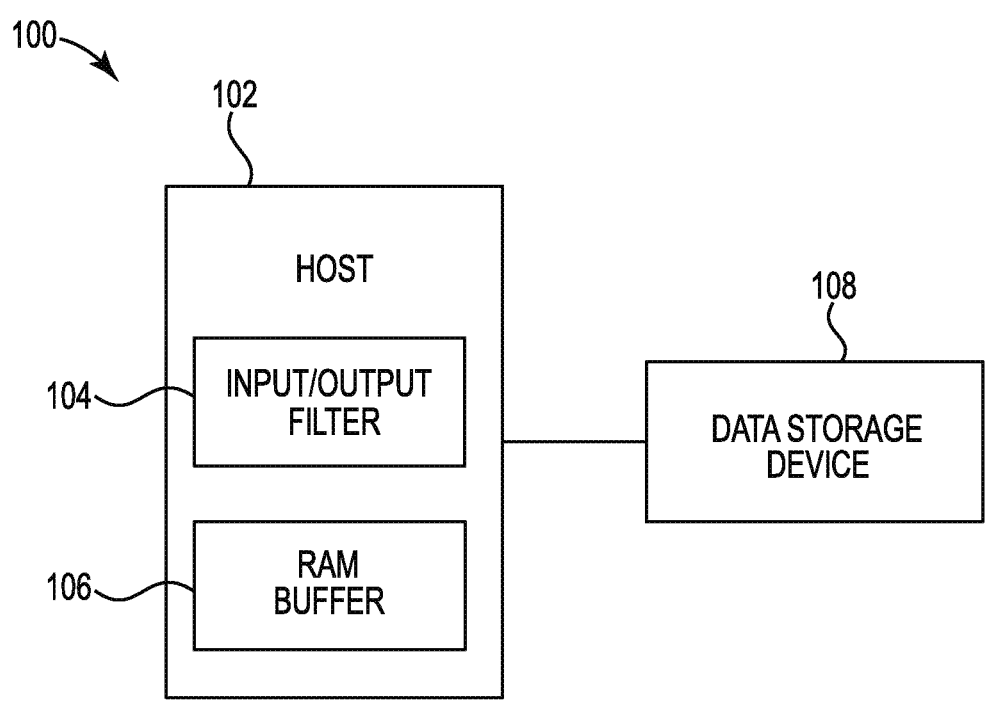
FIG. 1 illustrates a diagram of an example of a system for read operation redirect, according to the disclosure.

Data storage devices may include components for digitally storing data that may be read by a computing device. Data storage devices may include solid-state storage for non-volatile storage and/or retrieval of digital information utilizing electronic circuitry without the involvement of mechanical parts. Solid-state drives, also referred to as SSDs, may include data storage devices that utilize integrated circuit assemblies as memory to store data persistently (e.g., retains data when powered off). An SSD may include a memory element to store data. For example, the SSD may include a non-volatile not-and (NAND) memory configuration. That is, an SSD may include a non-volatile memory portion that utilizes NAND cells as a storage medium. A NAND cell may utilize NAND logic gates to store bits of information.

The physical hierarchy of NAND memory die may be broken down into planes, blocks, and pages. A NAND die may contain multiple planes, each plane may be divided into blocks and every block may contain N pages. For example, a NAND die may have 2 planes, ~4K blocks and 256 pages per block. The page may be the smallest unit that may be programmed (e.g., written to) and the block may be the smallest unit that may be erased.

An SSD may include a controller. A controller may incorporate electronics that bridge the NAND memory component to a host such as a host computing device, an application, a database, etc. A controller may accept host commands on one end and communicate the commands to the NAND memory on the other.

A host command may be directed to a portion of the SSD memory. A host command may include an input/out (I/O) request issued from a host to an SSD. For example, the host command may include a request to perform a read operation, which may include reading out data from a specific portion of the SSD memory to the host. Examples may also include a request to perform a program or write operation, which may include writing data to a specific portion of the SSD. Further examples may include a request to perform an erase operation to erase a specific portion of the SSD.

However, an abstraction scheme may be utilized in addressing specific portions of the SSD memory. For example, a logical block addressing abstraction scheme may be utilized in addressing the SSD memory. Utilizing a logical block addressing abstraction scheme may include utilizing a logical block address (LBA) to simplify the complex management of a lower level system (e.g., the SSD memory) by making the more complex memory management operations inherent in NAND arrays invisible to the higher levels (e.g., the host device) consuming the services of the lower level system. For example, NAND array management may include frequent change to a physical location of a block of data within the die for various reasons. The physical location of a block of data within the die may be referred to as a physical block address (PBA).

The logical block addressing abstraction scheme may avoid notifying the host of the new physical block address of a block every time it is changed. For example, a host may issue a command to an LBA of a specific block without knowledge of its PBA. The SSD may map LBAs to their corresponding PBAs and keep that map updated. The SSD controller may utilize the map to accurately coordinate execution of the commands. For example, the SSD controller may utilize a translation table to identify a physical portion (e.g., PBA) of an SSD corresponding to an LBA identified in an I/O request of the host.

SSD memory may have a finite number of program-erase (PIE) cycles before they wear out and become unusable. Additionally, the method utilized to read NAND memory may cause adjacent cells in the same memory block to change over time. For example, after repeated read operations to a cell an electrical resonance error may occur in adjacent cells. Such a disturbance in the content of adjacent cells may create errors that can result in data loss if the errors become too numerous to correct with an error-correcting code (ECC). A controller may intervene and copy the afflicted block to a new block when the error count exceeds a threshold in order to avoid an error uncorrectable by ECC. A controller may check the contents of the entire block each time a cell from the block is read to determine the error count.

Unexpectedly, repeated read operations to a block may also cause changes in the cells of blocks that are adjacent to the repeatedly read block. As used herein, an adjacent cell may include a cell that is physically near a cell being read from and/or written to, a cell that physically borders a cell being read from and/or written to, a cell that is in a close enough physical proximity to a cell being read from and/or written to that repeated read operations of the cell being read from may result in electrical resonance errors in the adjacent cell. Similarly, the changes may result in errors within the adjacent blocks such that the adjacent blocks suffer data loss on account of the errors becoming too numerous to correct with ECC. As described above, the controller may check the contents of the entire block each time the block is read from to determine an error count associated with the block. However, the controller may not check the contents of all adjacent blocks each time a block is read from. Instead, a controller will occasionally perform a read scan of the entire media to check the error counts associated with all the blocks. This scan may take minutes to perform and is performed relatively infrequently as compared to the single block check described above. As a result, errors in blocks adjacent to a frequently read block may go undetected and uncorrected resulting in data loss. This occurrence may be exacerbated since the same frequent reading from a block may consume the resources of the controller and further delay the read scan of the entire media that might otherwise discover the rising error count in adjacent cells.

In contrast, examples included in the present disclosure utilize an error count-agnostic system to identify and mitigate arising conditions precipitating the unexpected problem described above without directly adjusting or controlling the behavior of a host application. The examples included in the present disclosure may utilize an I/O filter system of an operating system to monitor read operations and write operations from a host to a data storage device. The examples may include redirection of successive read operations to a copy of frequently read portion of the data storage device in a RAM buffer within the host in order to avoid exacerbating the occurrence of errors in adjacent cells and to allow the controller time to conduct operations such as a read scan.

FIG. 1 illustrates a diagram of a system 100 for read operation redirect, according to the present disclosure. The system 100 may include a host 102. A host 102 may include a computing device such as a laptop, desktop, tablet, and/or a processing resource to execute instructions stored on a computer readable medium. A host 102 may include an operating system that acts as an interface between a user, hardware, and instructions. An operating system may include instructions executable by a host processor to manage hardware resources, instruction resources, and/or provide common services for computing applications serving the host 102. The host 102 may include the applications and/or may have access to applications that are remote to the host. The applications may include a collection of instructions that perform a specific task when executed by a processing resource.

The host 102 may include a driver. A driver may include a set of instructions executable by a processing resource to operate and/or control a particular type of device in communication with the host 102. A driver may act as an abstraction layer translating inputs and/or outputs between a host 102, a host application, and/or a host operating system and a hardware device. A driver may operate on a same privilege level as an operating system kernel. A driver may be part of an operating system of the host 102.

The system 100 may include a data storage device 108. The data storage device 108 may be in communication with the host 102. The data storage device 108 may be physically connected to the host 102. The data storage device 108 may be a peripheral device that is external to a host 102 device. The data storage device 108 may, alternatively, be housed in a same device as the host 102. For example, the data storage device 108 may be housed in the same housing, such as a computing device casing, as the host 102.

The data storage device 108 may be a solid-state device. A solid-state device may include an electronic device in which electricity flows through solid semiconductor crystals and in which data is stored utilizing electrons or other charge carriers, are confined entirely within solid materials. The data storage device 108 may include memory components for digitally storing data that may be read by a computing device. The data storage device 108 may include solid-state storage for non-volatile storage and/or retrieval of digital information utilizing electronic circuitry without the involvement of mechanical parts. The data storage device 108 may include a solid-state drive (SSD). As used herein, an SSD may include data storage devices that utilize integrated circuit assemblies as memory components to store data persistently. As used herein, an SSD may include data storage devices that share common characteristics with an SSD. An SSD may include may include non-volatile NAND cells as a storage medium. A data storage device 108 may include a device utilizing NAND flash memory for non-volatile data storage.

The data storage device 108 may include a controller. The controller may include circuitry that may bridge a memory component with the host 102. For example, the controller may accept commands from the host 102 and communicate and/or execute the commands to the memory component. The host 102 and the controller of the data storage device 108 may utilize a logical block addressing abstraction scheme. For example, the host 102 may communicate an I/O request addressing a portion of the data storage device 108 utilizing an LBA associated with the block. The host 102 may have no knowledge of an actual PBA of the block. The controller of the data storage device 108 may have knowledge of the PBA of the block associated with the LBA. That is, the controller of the data storage device 108 may have created and/or have access to a map and/or translation table of LBA to PBA correlations. The controller of the data storage device 108 may direct I/O requests from an LBA to a corresponding PBA utilizing the map and/or translation table.

The data storage device 108 may utilize ECC memory to detect and correct errors in the memory component of the data storage device 108. The data storage device 108 may copy a portion, for example a unit of data such as a block, of stored information to a new physical location on the memory storage device when an amount of errors associated with the portion exceeds a threshold. If an amount of errors associated with the portion reaches a second threshold, the data may become corrupt and/or uncorrectable by ECC.

The data storage device 108 may check an amount of errors associated with a portion of the memory component that is being read from, each time a read of that portion occurs. The data storage device 108 may conduct a read scan of a plurality of portions of the memory component and/or of the entire data storage device 108 on occasion and/or as resources of the data storage device 108 permit. The read scan may not be performed upon every read of a portion of the memory component of the data storage device 108.

The host 102 may include an I/O filter 104. The I/O filter 104 may be a driver and/or a set of drivers within the operating system in communication with one another. The I/O filter 104 may monitor commands sent from the host 102 to the data storage device 108. The commands may be generated by the operating system and/or an application on the host 102. The commands may include I/O requests to a controller of the data storage device 108. For example, the I/O filter 104 may monitor read operation requests and/or write operation requests from the host 102 to the controller of the data storage device 108.

Monitoring the read operations and write operations from the host 102 to the data storage device 108 may include intercepting the requests and directing them to their destination. For example, the I/O filter 104 may intercept a read operation and/or a write operation from an application on the host 102 and direct it to an underlying controller on the data storage device 108.

Monitoring a read operation and/or monitoring a write operation may include identifying a portion of the data storage device 108 being read from or written to in the operation. For example, an I/O request may be addressed to a particular portion of the data storage device 108. The particular portion of the data storage device 108 being read from or written to may be specified in the I/O request. The I/O filter 104 may analyze the I/O requests to determine the particular portion of the data storage device specified for the operation.

The I/O request may specify a portion of the data storage device 108 memory component at a file system level. A logical grouping of data may make up a file and may include a physical block to be read or written. The logical grouping of data and/or the storage location of the logical grouping of data may be identified by a filename. The filename may be utilized by the host 102 in addressing an I/O request as part of an abstraction scheme where the host 102 has no knowledge of the underlying physical location of the logical grouping of data on the memory component of the data storage device 108. The I/O filter 104 may identify the particular portion of the data storage device specified in each I/O request at the file system level from the content of the I/O requests it is monitoring.

The I/O request may specify a portion of the data storage device 108 memory component at a block access level. The hierarchy of a memory component of the data storage device 108 may be broken down into planes, blocks, and pages. A die of the memory component of the data storage device 108 may contain multiple planes, each plane may be divided into blocks and every block may contain N pages. The host 102 may address an I/O request to a portion of the memory component of a data storage device 108, such as a block, at the block access level by utilizing an LBA associated with the particular portion. The host 102 may have no knowledge of the PBA of the particular portion and may rely on a logical block addressing abstraction scheme of the data storage device 108 to address the I/O requests to the correct physical portion of the memory component of the data storage device 108. The I/O filter 104 may identify the particular portion of the data storage device specified in each I/O request at the block access level from the content of the I/O requests it is monitoring.

Monitoring the read operations and/or write operations from the host 102 to the data storage device 108 may include determining an amount of read operations and/or write operations addressed to a particular portion of the memory component of the data storage device 108. Determining an amount of read operations and/or write operations addressed to a particular portion of the memory component may include counting and collating the read operations and/or write operations based on an address associated with the operation. Since the host 102 may be agnostic to a PBA of a portion of the memory component being read and/or written to, the address associated with the operation may include the file system address and/or LBA that an I/O request is addressed to. Counting the read operation and/or the write operations may include counting the requests over a period of time. For example, counting the requests over a period of time may include determining a frequency of read operations and/or write operations to a same address. Determining an amount of read operations and/or write operations addressed to a particular portion of the memory component may also include counting and collating the read operations and/or write operations based on a size of the portion of the memory component of the data storage device 108 that is being read from or written to. Collating by size may facilitate a determination of whether more than one portion of the memory component is being read from and/or written to for a given operation and/or if more than one memory portion may be affected by the operation.

The I/O filter 104 may monitor the amount of read operations directed to a particular portion of the memory component of the data storage device 108 over a period of time relative to a threshold of read operations for the particular portion. The threshold of read operations may be a threshold amount of read operations performed on the particular portion of the memory component over a period of time. The threshold may be based on manufacturer specifications for the memory component. The threshold may be a user configurable option for the memory component. The threshold may include a frequency of read operations to a particular portion of memory that once exceeded triggers a response to mitigate a potential for causing electrical resonance errors in adjacent memory portions by frequent reading of the particular portion of memory.

The I/O filter 104 may trigger a mitigation response upon detecting that the frequency of read operations from the host 102 to a particular portion of the memory component of the digital storage device has exceeded the threshold of read operations described above. For example, the I/O filter 104 may, based on the monitored read operations, determine whether the frequency of read operations to a particular portion of the memory component has exceeded the threshold. The I/O filter 104 may, responsive to determining that he monitored read operations to the portion of the memory component have exceeded the threshold, create a random-access memory (RAM) buffer 106 within the host 102. Creating a RAM buffer 106 within the host 102 may include copying the portion of the memory component of the data storage device 108 to RAM within the host. The creation of the RAM buffer 106 may mitigate the generation of errors in portions of the memory component adjacent to the particular portion of the memory component cause by frequent reading operations on the particular portion by providing a different location (e.g., the RAM buffer 106) from which to read the data from the particular portion of the memory component.

Figure 2:
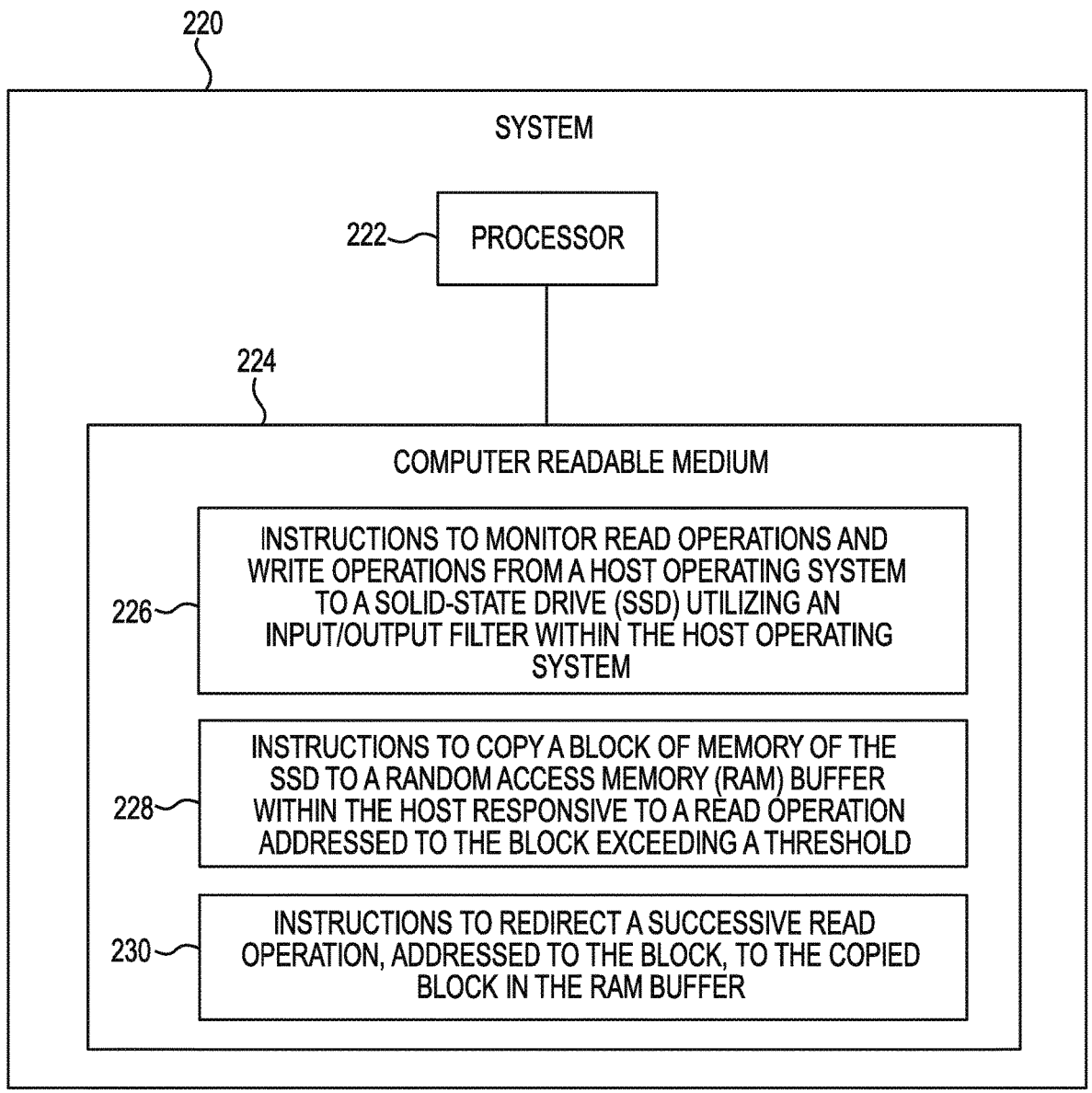
FIG. 2 is a block diagram of an example of a system for read operation redirect, according to the disclosure.

Subsequent to the creation of the RAM buffer 106, the I/O filter 104 may intercept successive I/O requests (e.g., the I/O requests coming after the creation of the RAM buffer 106) addressed to the particular portion of the memory component that was copied to the RAM buffer 106. The I/O filter 104 may redirect the successive I/O requests, such as the read operations and/or write operations, that are addressed to the particular portion of the memory component (e.g., addressed to the filename and/or LBA associated with the particular portion) to the copied portion in the RAM buffer 106. The redirection may have the effect of reducing the frequency of read operations to the particular physical location, reduce the overall amount of read operations to the particular physical location, and/or provide the data storage device 108 the time and resources to complete a full read scan of the memory component and correct any errors through ECC caused in adjacent memory portions, FIG. 2 is a block diagram of an example system 220 for read operation redirect, according to the present disclosure. System 220 may be the same as or different than, system 100 illustrated in FIG. 1. System 220 may include at least one computing device that is capable of communicating with at least one remote system. In the example of FIG. 2, system 220 includes a processor 222 and a computer-readable medium 224. Although the following descriptions refer to a single processor and a single computer-readable medium, the descriptions may also apply to a system with multiple processors and computer-readable mediums. In such examples, the instructions may be distributed (e.g., stored) across multiple computer-readable mediums and the instructions may be distributed (e.g., executed by) across multiple processors.

Processor 222 may be a central processing unit (CPUs), a microprocessor, and/or other hardware devices suitable for retrieval and execution of instructions stored in computer-readable medium 224. In the particular example shown in FIG. 2, processor 222 may receive, determine, and send instructions 226, 228, and 230 for read operation redirect. As an alternative or in addition to retrieving and executing instructions, processor 222 may include an electronic circuit comprising a number of electronic components for performing the functionality of an instruction in computer-readable medium 224. With respect to the executable instruction representations (e.g., boxes) described and shown herein, it should be understood that part or all of the executable instructions and/or electronic circuits included within a particular box may be included in a different box shown in the figures or in a different box not shown.

Computer-readable medium 224 may be any electronic, magnetic, optical, or other physical storage device that stores executable instructions. Thus, computer-readable medium 224 may be, for example, Random Access Memory (RAM), an Electrically-Erasable Programmable Read-Only Memory (EEPROM), a storage drive, an optical disc, and the like. Computer-readable medium 224 may be disposed within system 220, as shown in FIG. 2. In this situation, the executable instructions may be "installed" on the system 220. Additionally and/or alternatively, computer-readable medium 224 may be a portable, external or remote storage medium, for example, that allows system 220 to download the instructions from the portable/external/remote storage medium. In this situation, the executable instructions may be part of an "installation package". As described herein, computer-readable medium 224 may be encoded with executable instructions for scanning with destination marks.

Referring to FIG. 2, instructions 226, when executed by a processor (e.g., processor 222), may cause system 220 to utilize an I/O filter within a host operating system to monitor input/output requests. For example, the I/O filter within the host may be utilized to monitor read operations and/or write operations sent from the host operating system to an SSD. The SSD may be a NAND type flash memory device.

Monitoring read operations and/or write operations may include intercepting the read operations and/or the write operations at an application layer of the host operating systems. The I/O filter may analyze the intercepted read operations and/or write operations and determine a block of memory that an application running on a host and/or a host operating system is directing an intercepted operation to. For example, an I/O filter may identify a filename and/or LBA associated with an operation. Since the filename and/or LBA may be a logical address associated with an abstraction scheme, the I/O filter and/or the host may be unaware of an actual physical location or PBA of the addressed data on the SSD memory die.

Instructions 228, when executed by a processor (e.g., processor 222), may cause system 220 to monitor an amount and/or frequency of read operations addressed to a block of the SSD memory die. The instructions 228, when executed by a processor (e.g., processor 222) may cause system 220 to copy a particular block or blocks of the SSD memory to a RAM buffer within the host. The particular block or blocks may be copied to the RAM buffer responsive to a determination that a read operation addressed to the particular block or blocks exceeds a threshold.

For example, particular block or blocks may be copied to the RAM buffer responsive to a determination that an amount and/or frequency of read operations to the particular block or blocks has exceeded a threshold amount and/or frequency of read operations for the particular blocks beyond which successive reads may result in error increases in adjacent blocks. Again, since the host, host operating system, applications, and/or I/O filter utilize an addressing abstraction scheme; they can all be unaware of the physical location or PBA of the corresponding data on the die. As such, the block of memory of the SSD can be copied to the RAM buffer at the host responsive to the read operation to the block exceeding the threshold and independent of any knowledge of the condition of the memory on the SSD such as any errors on the SSD. This is in contrast to systems, such as those utilized by SSDs that scan blocks, identify errors in a block, and responsive to determining that the block or physical location of the SSD memory has a certain number of errors the SSD will move the data to a different block on the SSD memory.

Instructions 230, when executed by a processor (e.g., 222), may cause system 220 to redirect a successive read operation (e.g., a read operation issued subsequent to copying the particular block into the RAM buffer of the host) addressed to the particular block (e.g., addressed to a filename and/or LBA corresponding to the data from the particular block) to the copied block in the RAM buffer.

Figure 3:
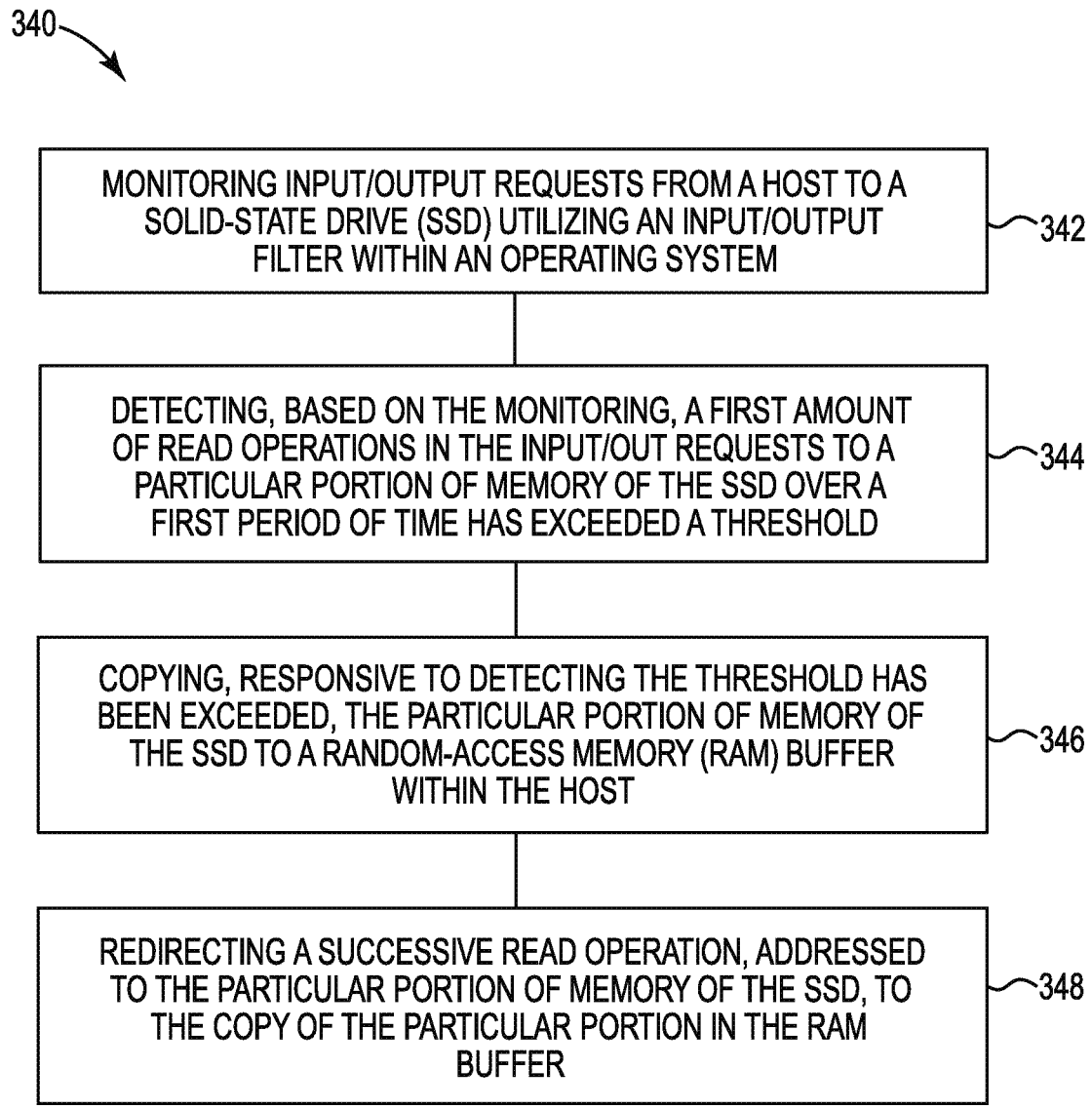
FIG. 3 illustrates an example method for read operation redirect, according to the disclosure.

FIG. 3 illustrates an example method 340 for read operation redirect, according to the present disclosure. At 342, the method 340 may include monitoring I/O requests from a host to a solid-state drive (SSD). The I/O requests may be monitored utilizing an input/output filter within an operating system of the host.

At 344, the method 340 may include detecting and/or counting read operations associated with each portion of a memory of an SSD. For example, an amount of read operations to a particular portion of memory of the SSD over a first period of time may be detected. Further, at 344, the method 340 may include detecting, based on the monitoring, a first amount of read operations in the I/O requests to a particular portion of the memory of the SSD over a first period of time has exceeded a threshold. The threshold may be an amount of read operations over a period of time that, once exceeded, may result in errors and/or data loss in portions of the memory of the SSD adjacent to the particular portion being read from.

At 346, the method 340 may include copying, responsive to detecting the above-mentioned threshold has been exceeded, the particular portion of the memory of the SSD to a different memory location. For example, the different memory location may include a RAM buffer created within the host responsive to a determination that the above-mentioned threshold has been exceeded.

At 348, the method 340 may include redirecting a successive operation. A successive read operation may include a read operation addressed to the particular portion of the memory of the SSD. For example, the read operation may be addressed to a filename and/or an LBA abstraction corresponding to the data saved at the particular portion of the memory of the SSD. The successive read operation that is addressed to the particular portion of the memory of the SSD may be redirected to the copy of the particular portion in the RAM buffer.

The copy of the particular portion of the memory of the SSD may be removed from the RAM buffer. For example, the copy of the particular portion of the memory of the SSD may be removed from the RAM buffer responsive to detecting, based on the monitoring of input/output requests, a write operation addressed to the particular portion of the memory of the SSD subsequent to having copied that particular portion to the RAM buffer. Successive operations addressed to the particular portion may then be passed to the SSD controller for communication to the newly written particular portion of the SSD memory on the die. The newly written particular portion of the SSD memory may subsequently be written to the RAM buffer in the event that the read operations to the logical address associated with the newly written particular portion exceed the threshold again.

In another example, the copy of the particular portion of the memory of the SSD may be removed from the RAM buffer responsive to detecting, based on the monitoring of input/output requests, a second amount of read operations over a second period of time in the input/output requests addressed to the particular location of memory of the SSD subsequent to copying the particular portion to the RAM buffer. For example, if a host application is repeatedly sending I/O requests for a particular portion of data, but then finishes its process involving the particular portion so decreases or eliminates the frequency that it is requesting a read operation of the particular portion. If the reduced frequency falls below the above-mentioned threshold and/or a second threshold, the risk of introducing errors to adjacent portions of the SSD memory by frequently reading the particular portion may be dissipated. As such, the copy of the particular portion may be released from the RAM buffer and successive operations may be passed to the SSD controller for communication to the particular portion of the SSD memory on the die once again. The particular portion of the SSD memory may subsequently be re-written to the RAM buffer in the event that the read operations to the logical address associated with the particular portion exceed the threshold again.

In another example, the copy of the particular portion of the memory of the SSD may be removed from the RAM buffer responsive to detecting that an application generating the first amount of read operations has exited. For example, an I/O filter, operating system, and/or host may monitor application activity on the host. If a host application is repeatedly sending I/O requests for a particular portion of data, but that application exits then the read operation requests for that particular portion may cease. As such, the copy of the particular portion may be released from the RAM buffer and successive operations may be passed to the SSD controller for communication to the particular portion of the SSD memory on the die once again. The particular portion of the SSD memory may subsequently be re-written to the RAM buffer in the event that the read operations to the logical address associated with the particular portion exceed the threshold again.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designator "N", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor.

What is claimed:

1. A system comprising:
  a data storage device accessible by a host;
  an input/output filter system of an operating system of the host to:
    monitor read operations and write operations for an error count from the host to the data storage device;
    copy a portion of the data storage device to a random-access memory (RAM) buffer within the host responsive to monitored read operations to the portion exceeding a threshold corresponding to the error count; and
    redirect a successive read operation, addressed to the portion of the data storage device, to the copy of the portion in the RAM buffer.

2. The system of claim 1, wherein the input/output filter system includes a set of drivers within the operating system.

3. The system of claim 1, wherein to monitor read operations and write operations includes intercepting a request from an application on the host to an underlying controller of the data storage device.

4. The system of claim 1, wherein to monitor read operations includes identifying a portion of the data storage device being read in each of the monitor read operations at a file system level.

5. The system of claim 1, wherein to monitor read operations includes identifying a portion of the data storage device being read in each of the monitor read operations at a block access level.

6. The system of claim 1, wherein to monitor read operations and write operations includes to count and collate the read operations based on an address of a portion of the data storage device being read from and a size of the portion being read.

7. The system of claim 1, wherein the threshold is a user configurable read frequency threshold for the location.

8. A non-transitory computer-readable medium containing instructions executable by a processor to cause the processor to:
  monitor read operations and write operations for an error count from a host operating system to a solid-state drive (SSD) utilizing an input/output filter within the host operating system;
  copy a block of memory of the SSD to a random-access memory (RAM) buffer within the host responsive to a read operation addressed to the block exceeding a threshold corresponding to the error count; and
  redirect a successive read operation, addressed to the block, to the copied block in the RAM buffer.

9. The non-transitory computer-readable medium of claim 8, wherein the SSD is a not-and (NAND) type flash memory device.

10. The non-transitory computer-readable medium of claim 8, wherein the block of memory of the SSD is copied to the RAM buffer at the host responsive to the read operation to the block exceeding the threshold independent of a knowledge of the memory condition on the SSD.

11. The non-transitory computer-readable medium of claim 8, wherein monitoring read operations and write operations includes intercepting the read operations and the write operations at an application layer of the host operating system and determining a block of memory that an application or the host operating system is directing a read operation to.

12. A method comprising:
- monitoring input/output requests for an error count from a host to a solid-state drive (SSD) utilizing an input/output filter within an operating system;
- detecting, based on the monitoring, a first amount of read operations in the input/output requests to a particular portion of memory of the SSD over a first period of time has exceeded a threshold corresponding to the error count;
- copying, responsive to detecting the threshold has been exceeded, the particular portion of memory of the SSD to a random-access memory (RAM) buffer within the host; and
- redirecting a successive read operation, addressed to the particular portion of memory of the SSD, to the copy of the particular portion in the RAM buffer.

13. The method of claim 12, further comprising:
- removing the copy of the particular portion of the memory of the SSD from the RAM buffer responsive to detecting, based on the monitoring, a write operation to the particular portion of the memory of the SSD subsequent to copying the particular portion to the RAM buffer.

14. The method of claim 12, further comprising:
- removing the copy of the particular portion of the memory of the SSD from the RAM buffer responsive to detecting, based on the monitoring, a second amount of read operations over a second period of time in the input/output requests to the particular location of memory of the SSD subsequent to copying the particular portion to the RAM buffer.

15. The method of claim 12, further comprising:
- removing the copy of the particular portion of the memory of the SSD from the RAM buffer responsive to detecting that an application generating the first amount of read operations has exited.

* * * * *